(12) United States Patent
Inamori et al.

(10) Patent No.: US 6,985,949 B2
(45) Date of Patent: Jan. 10, 2006

(54) CONTENT DELIVERY SYSTEM ALLOWING LICENSED MEMBER TO UPLOAD CONTENTS TO SERVER AND TO USE ELECTRONIC MAIL FOR DELIVERING URL OF THE CONTENTS TO RECIPIENT

(75) Inventors: Shinichi Inamori, Nagano (JP); Satoshi Odaira, Nagano (JP); Shuji Maruyama, Nagano (JP)

(73) Assignee: Shinano Kenshi Kabushiki Kaisha, Nagano (JP)

( * ) Notice: Subject to any disclaimer, the term of this patent is extended or adjusted under 35 U.S.C. 154(b) by 785 days.

(21) Appl. No.: 09/852,805

(22) Filed: May 11, 2001

(65) Prior Publication Data

US 2001/0042102 A1 Nov. 15, 2001

(30) Foreign Application Priority Data

May 12, 2000 (JP) .............................. 2000-139623

(51) Int. Cl.
*G06F 15/173* (2006.01)
(52) U.S. Cl. ...................................... 709/225; 709/219
(58) Field of Classification Search ................ 709/219, 709/208, 225, 229, 206; 707/10; 705/50, 705/54, 27, 26, 51
See application file for complete search history.

(56) References Cited

U.S. PATENT DOCUMENTS

| | | | | |
|---|---|---|---|---|
| 5,781,901 A | * | 7/1998 | Kuzma | 707/10 |
| 5,790,790 A | * | 8/1998 | Smith et al. | 709/206 |
| 6,192,407 B1 | * | 2/2001 | Smith et al. | 709/229 |
| 6,327,610 B2 | * | 12/2001 | Uchida et al. | 709/206 |
| 6,385,596 B1 | * | 5/2002 | Wiser et al. | 705/51 |
| 6,587,837 B1 | * | 7/2003 | Spagna et al. | 705/26 |
| 6,625,581 B1 | * | 9/2003 | Perkowski | 705/27 |
| 6,684,248 B1 | * | 1/2004 | Janacek et al. | 709/225 |
| 6,820,063 B1 | * | 11/2004 | England et al. | 705/54 |
| 2003/0135464 A1 | * | 7/2003 | Mourad et al. | 705/50 |

FOREIGN PATENT DOCUMENTS

| | | |
|---|---|---|
| JP | 6-222956 | 8/1994 |
| JP | 7-143165 | 6/1995 |
| JP | 11-187188 | 7/1999 |
| JP | 11-203217 | 7/1999 |

* cited by examiner

*Primary Examiner*—Le Hien Luu

(74) *Attorney, Agent, or Firm*—Birch, Stewart, Kolasch & Birch, LLP

(57) ABSTRACT

The contents delivery system is capable of delivering multimedia contents efficiently, securely, easily and economically. In the contents delivery system, a data transmitter transmits the contents, and the data transmitter is connected to a communication network. A data receiver receives the contents, and the data receiver is connected to the communication network. The contents are attached to electronic mail, which is transmitted from the data transmitter to the data receiver. Commands for processing the contents in the data receiver are written in the electronic mail. The data receiver has a unit for executing the commands and processing the contents.

21 Claims, 14 Drawing Sheets

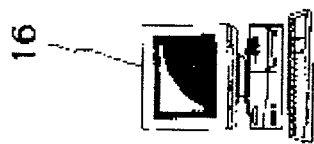
FIG. 5
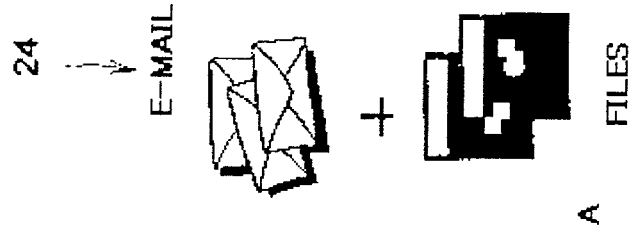
COMMANDS
- MUSIC DATA
- CM DATA
- SCHEDULE DATA

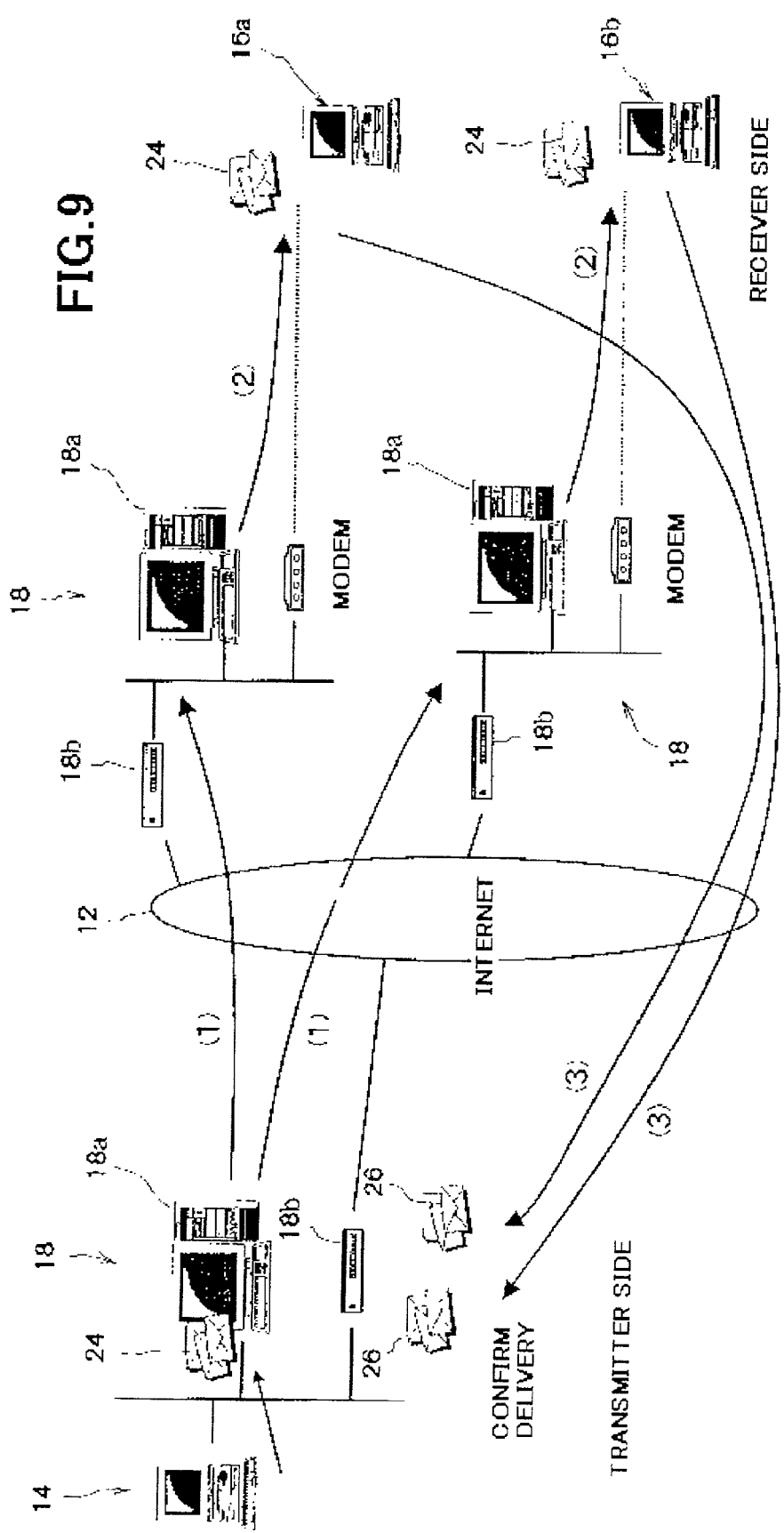

CONTENT DELIVERY SYSTEM ALLOWING LICENSED MEMBER TO UPLOAD CONTENTS TO SERVER AND TO USE ELECTRONIC MAIL FOR DELIVERING URL OF THE CONTENTS TO RECIPIENT

BACKGROUND OF THE INVENTION

The present invention relates to a contents delivery system, which is capable of delivering multimedia contents by electronic mails (E-mails).

Conventionally, multimedia contents including image data of pictures and photographs, music data, text data are sent from a data transmitter to a data receiver by several ways.

For example, in a first way, the data transmitter is connected to the corresponding data receiver by a telephone line or an ISDN (trademark) line, and the data receiver is directly connects to the data transmitter via the line so as to receive the contents.

In a second way, the data transmitter is connected to a plurality of the data receivers by a switchboard and telephone lines so as to deliver the contents to the data receivers.

In a third way, the data receivers are connected to a communication network, e.g., LAN, the internet, to which a server, which acts as the data transmitter, is connected, and the data receiver download the contents from the server.

A desired contents delivery system should deliver the contents efficiently, securely, easily and economically.

To efficiently deliver the contents, the contents should be simultaneously delivered to a plurality of the data receivers.

To securely deliver the contents, the data transmitter should check if the contents are received by the data receivers.

To easily deliver the contents, the data transmitter should assign detail action of the data receivers, which have received the contents. If the data transmitter is able to control the action of the data receiver, for example the contents, which have been compressed and delivered, can be automatically thawed and stored in an assigned place. Therefore, a user of the data receiver need not process the received contents, so that the contents can be gained easily.

To economically deliver the contents, no specific process and no specific means should be required. The contents should be delivered by existing infrastructures.

However, the conventional contents delivery systems cannot satisfy the requirements of the desired delivery system.

SUMMARY OF THE INVENTION

The present invention is invented to solve the problem of the conventional delivery system.

An object of the present invention is to provide a contents delivery system capable of delivering the contents efficiently, securely, easily and economically.

A first basic structure of the contents delivery system of the present invention comprises:

a communication network;

a data transmitter for transmitting contents, the data transmitter being connected to the communication network; and a data receiver for receiving the contents, the data receiver being connected to the communication network, wherein the contents are attached to electronic mail, which is transmitted from the data transmitter to the data receiver, and commands for processing the contents in the data receiver are written in the electronic mail, and the data receiver has a unit for executing the commands and processing the contents.

By using the electronic mail, which have been widely used in society, the contents delivery system can be realized economically, and the contents can be simultaneously delivered to a plurality of the data receivers. Since the commands for processing the contents in the data receiver are written in the electronic mail, the contents can be automatically processed, e.g., thawed, stored, in the data receiver, so that jobs of the data receiver can be reduced and the contents can be easily delivered.

In the contents delivery system, the data receiver may have a unit, which transmits confirmation electronic mail to the data transmitter when the data receiver normally receives the electronic mail. With this structure, the data transmitter can securely confirm if the contents have been perfectly delivered or not.

A second basis structure of the contents delivery system of the present invention comprises:

a communication network;

a data transmitter for transmitting contents, the data transmitter being connected to the communication network; and a data receiver for receiving the contents, the data receiver being connected to the communication network, wherein a server, which stores the contents to be received by the data receiver, is connected to the communication network, a name of the server and a storing path of the contents to be received by the data receiver are written in the electronic mail, and the data receiver has a unit for accessing the server written in the electronic mail and downloading the contents from the server via the storing path written in the electronic mail.

By using the electronic mail, the contents delivery system can be realized economically, and the contents can be simultaneously delivered to a plurality of the data receivers. Since no contents are attached to the electronic mail, the contents can be delivered to the data receiver by the server connected to the communication network and separated from the data transmitter, even if the line between the data transmitter and the communication network is crowded.

In the contents delivery system, the data transmitter may be a first data transmitter, a second data transmitter, which uploads the contents to the server, may be connected to the communication network, the second data transmitter may allow a licensed member to upload the contents to the server, and the first data transmitter may allow the licensed member to transmit the electronic mail to the data receiver. With this structure, only the legally licensed contents can be delivered, so that illegal contents can be omitted and copyrights can be effectively protected.

In The contents delivery system, a second server may be connected to the communication network, the data receiver may have a unit for periodically uploading log data of actional history to the second server, and the first data transmitter and/or the second data transmitter may have a unit for accessing the second server and downloading the log data. With this structure, an operator of the data transmitter can know number of using the contents.

In the contents delivery system, a pager server, which receives the electronic mail sent from the data transmitter, may be connected to the communication network, a plurality of pagers may be connected to the data receiver, a base station, which transmits contents of the electronic mail to an assigned pager, whose number is written in an address part of the electronic mail, by radio, may be connected to the pager server, and the data receiver may receive the electronic mail via the pager. With this structure, the electronic mail can be automatically inputted to the data receiver without accessing to a mail server in the communication network and confirming if the electronic mail has been kept in the mail server or not. Therefore, the electronic mail can be sent to the data receiver without delay, and the contents also can be delivered soon.

In the contents delivery system, the contents transmitted to the data receiver may be music data, and the data receiver may have a unit for reproducing the music data.

In the contents delivery system, commands for self-checking the data receiver may be written in the electronic mail, and the data receiver may have a unit for executing the self-check commands and transmitting another electronic mail, in which results of the self-check are written, to the data transmitter. With this structure, remote maintenance can be realized.

BRIEF DESCRIPTION OF THE DRAWINGS

Embodiments of the present invention will now be described by way of examples and with reference to the accompanying drawings, in which:

FIG. 5 is an explanation view of an outline of the contents delivery system of the present invention;

FIG. 9 is an explanation view showing a process of sending electronic mail of FIG. 8;

DETAILED DESCRIPTION OF THE PREFERRED EMBODIMENTS

Preferred embodiments of the present invention will now be described in detail with reference to the accompanying drawings.

An outline of the contents delivery system 10 of the present invention will be explained with reference to FIGS. 1–4.

Figure 1:
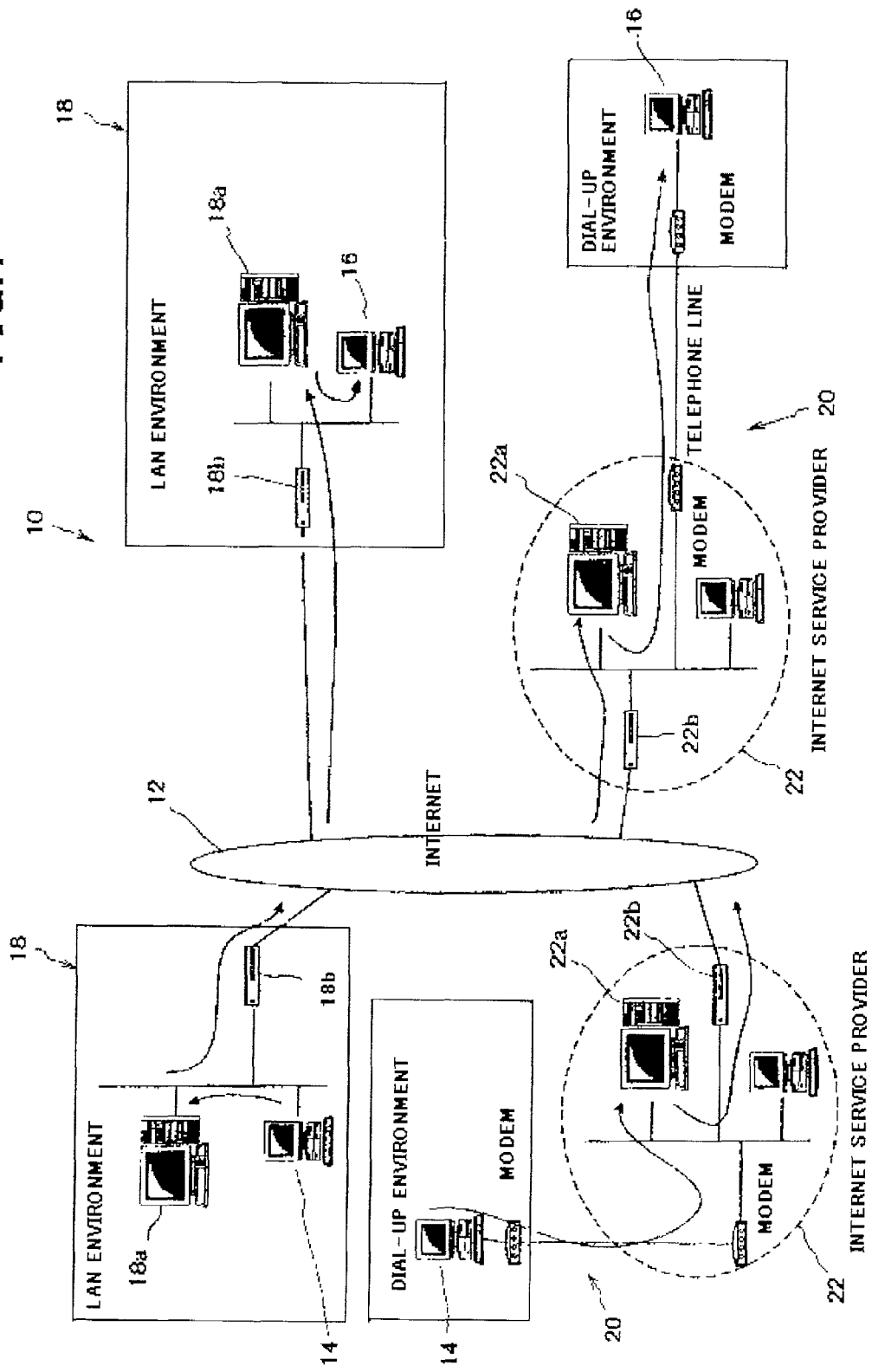
FIG. 1 is an explanation view of an ordinary network, in which electronic mail can be sent and received.

FIG. 1 shows an ordinary system, in which electronic mails (E-mails) are delivered through the internet 12, which is an example of communication networks. Under the existing network environment, the contents delivery system 10 of the present invention is capable of delivering multimedia contents from a data transmitter 14 to one or a plurality of data receivers 16 by the E-mails. The data transmitter 14 and the data receivers are computers, each of which has a control unit, an input unit, an memory unit, an arithmetic logical unit, an output unit, etc.

Figure 2:
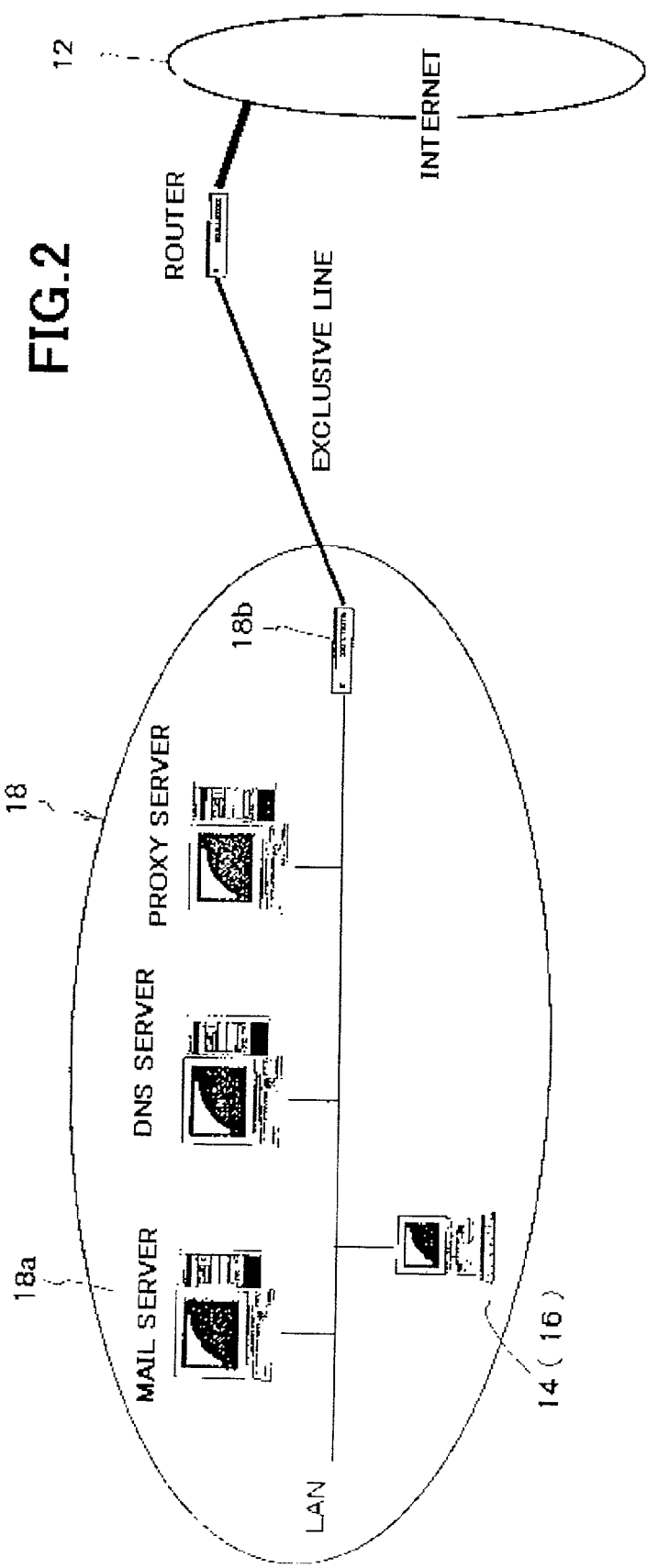
FIG. 2 is an explanation view of a LAN, in which electronic mail can be sent and received.

The E-mails can be delivered through the internet 12 under various types of environments. Firstly, the E-mails can be delivered under LAN environments 18. Details are shown in FIG. 2.

Figure 3:
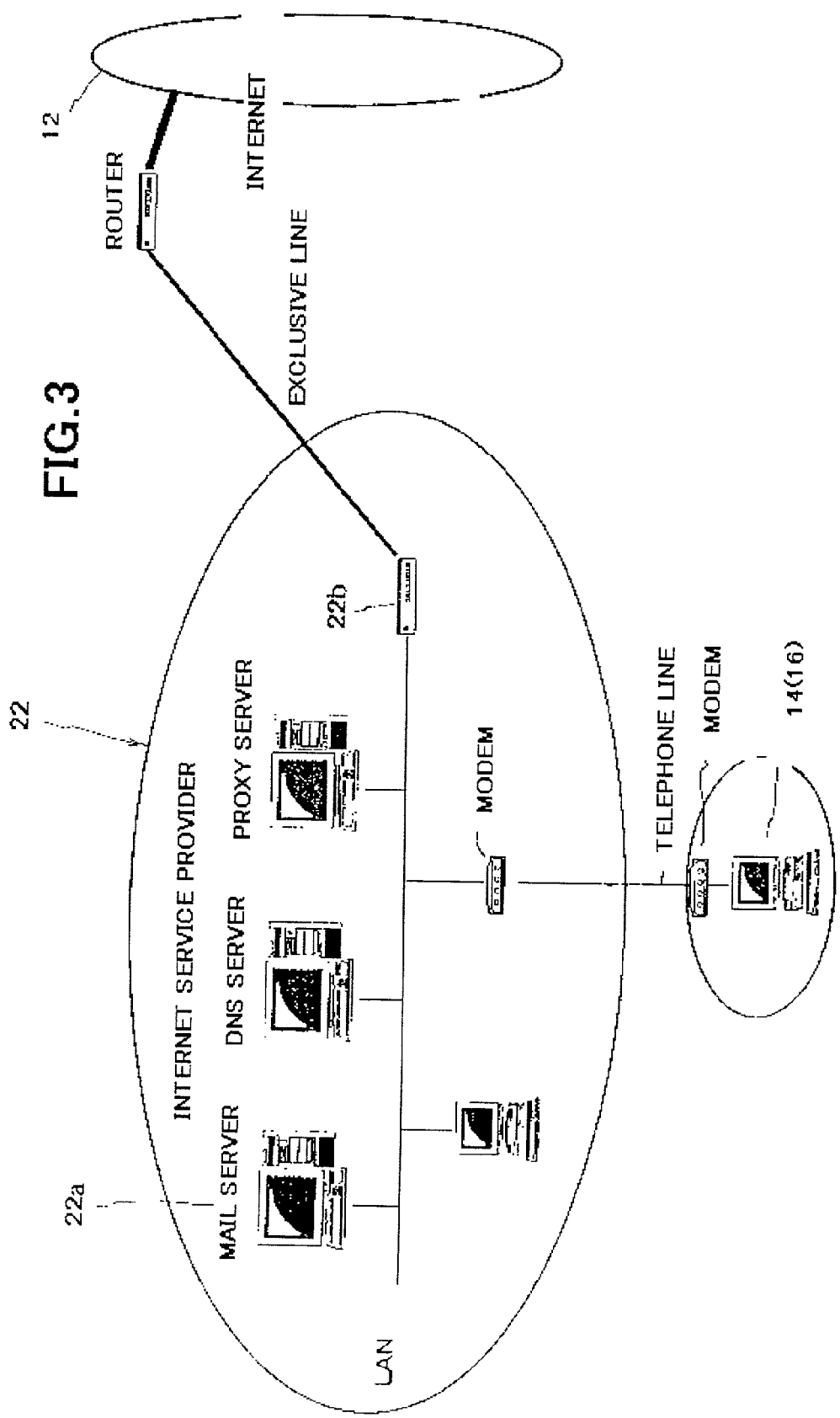
FIG. 3 is an explanation view of a dial-up environment, in which electronic mail can be sent and received.
Figure 4:
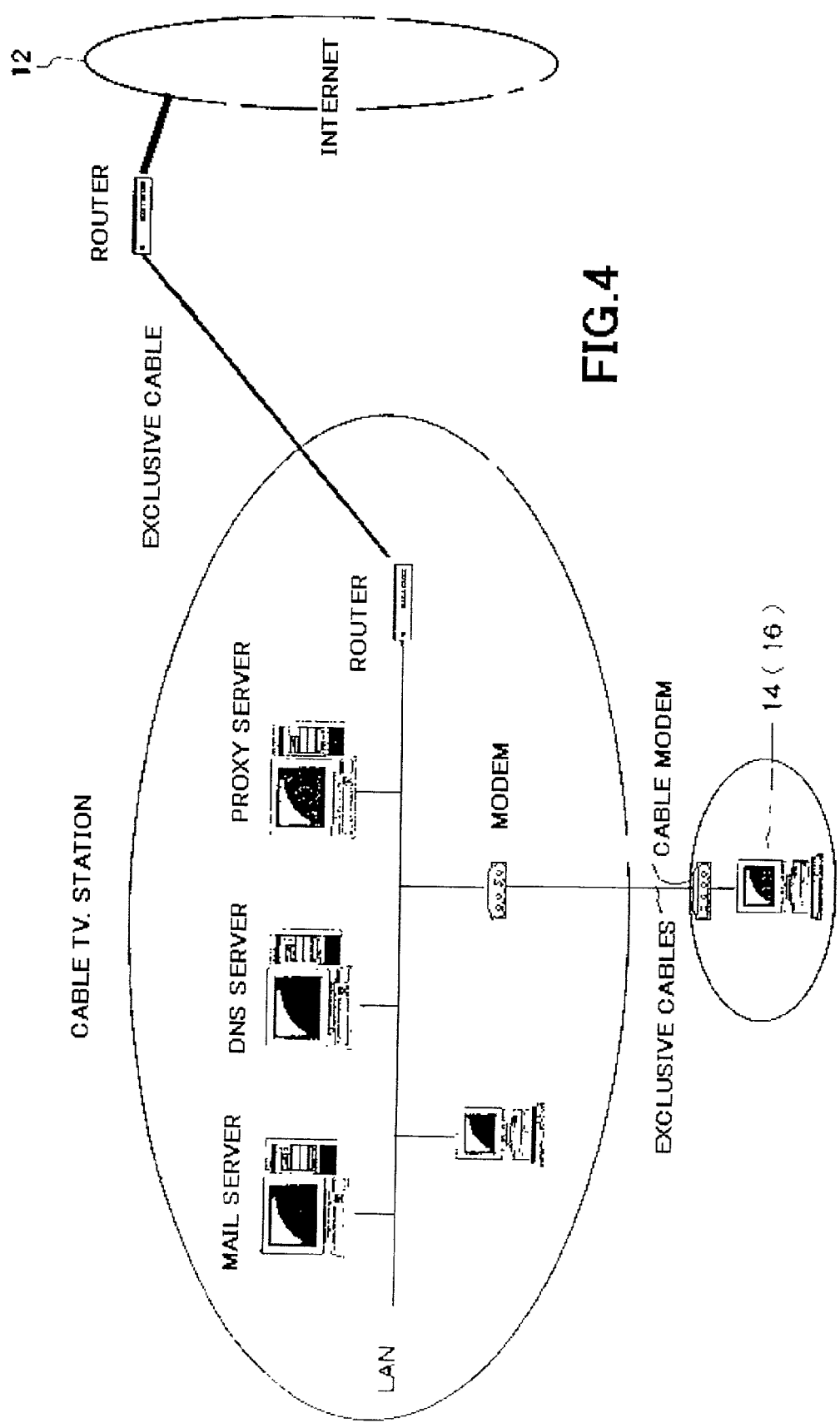
FIG. 4 is an explanation view of an environment, in which electronic mail can be sent and received through a provider, e.g., a cable TV station.

Secondly, the E-mails can be delivered under dial-up environments 20. Under the dial-up environments 20, the E-mails are delivered through servers, e.g., a mail server, of an internet service provider 22. Details are shown in FIG. 3. The data transmitter 14 and the data receivers 16 are connected to the provider 22 by telephone lines. Note that, a cable TV station may act as the provider 22 (see FIG. 4). In this case, the data transmitter 14 and the data receivers 16 are connected to the cable TV station by exclusive cables. Terminators of the both cases, e.g., modems, are different. But the both cases are included in the dial-up environments 20.

In the present invention, the data transmitter 14 and the data receivers 16 are connected to the LAN environments 18 or the dial-up environments 20.

First Embodiment

The contents delivery system 10 of a first embodiment will be explained.

The basic structure of the system 10, which is capable of delivering the E-mails, is shown in FIG. 1.

As described above, the data transmitters 14, which transmit the contents, are respectively connected to the LAN environment 18 and the dial-up environments 20.

The data receivers 16, which receive the contents, are also respectively connected to the LAN environment 18 and the dial-up environment 20. Note that, the contents delivery system of the present invention may be realized under the LAN environments 18 or the dial-up environments 20.

Next, a method of sending the contents from the data transmitters 14 to the data receivers 16 will be explained.

As shown in FIG. 5, the contents to be delivered, e.g., music data, commercial message (CM) data, schedule data, are attached to the E-mails 24, which are sent from the data transmitter 14 to the data receiver 16. And, commands (control scripts) for processing the contents in the data receiver 16 are written in bodies of the electronic mails 24.

The data receiver 16 has a unit for reading and executing the commands, which are written in the E-mails 24. The unit processes the attached contents when the data receiver receives the E-mails 24, to which the contents are attached.

For example, if the contents are compressed to reduce capacity thereof, the contents are thawed. And, the contents are stored in a memory unit of the data receiver 16.

In the present embodiment, the computer of the data receiver 16 acts as the unit for executing the commands. But it is not limited to the present embodiment, a hardware for processing the E-mails, for example, may act as the unit.

Figure 6:
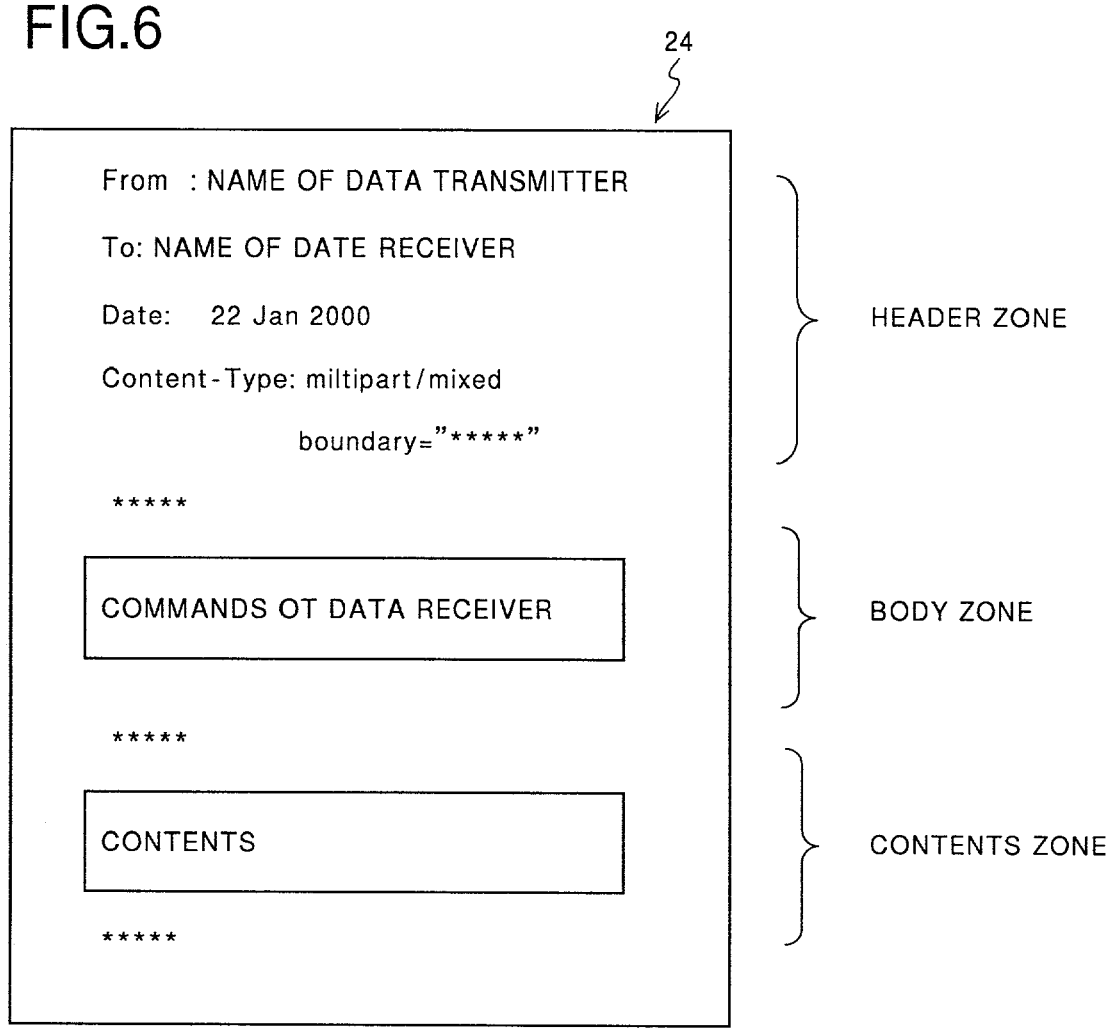
FIG. 6 is an explanation view of electronic mail, which is used in the contents delivery system shown in FIG. 5.

An example format of the E-mail 24 is shown in FIG. 6.

In the present embodiment, the E-mail 24 is divided into three zones by boundaries (*****).

A header zone includes a name of the data transmitter 14, which transmits the contents, a name of the data receiver 16, which is a destination of the contents, and date of transmission. Further, time of transmission, etc. may be included in the header zone.

A body zone includes a body of the E-mail. In the present embodiment, the commands to the data receiver 16 are the body of the E-mail 24.

A contents zone includes the contents, which is attached to the E-mail 24.

Next, a process of delivering the contents will be explained with reference to FIG. 1.

Firstly, the data transmitter 14 and the data receiver 16 are respectively connected to the LANs 18 so as to deliver contents from the data transmitter 14 to the data receiver 16.

A route of delivering the E-mail is as follows: the data transmitter 14→a mail server 18a, which is connected to the LAN 18 to which the data transmitter 14 is connected→a router 18b→the internet 12→a router 18, which is connected to the LAN 18 to which the data receiver 16 is connected→a mail server 18a→the data receiver 16.

On the other hand, in the case that the data transmitter 14 and the data receiver 16 are respectively connected to the dial-up environments 20, the E-mail is sent via a following route: the data transmitter 14→servers of the provider 22, e.g., a mail server 22a, →a router 22b→the internet 12. And, the E-mail is received via a following route: the internet 12→a router 22b→a mail server 22a→the data receiver 16.

Figure 7:
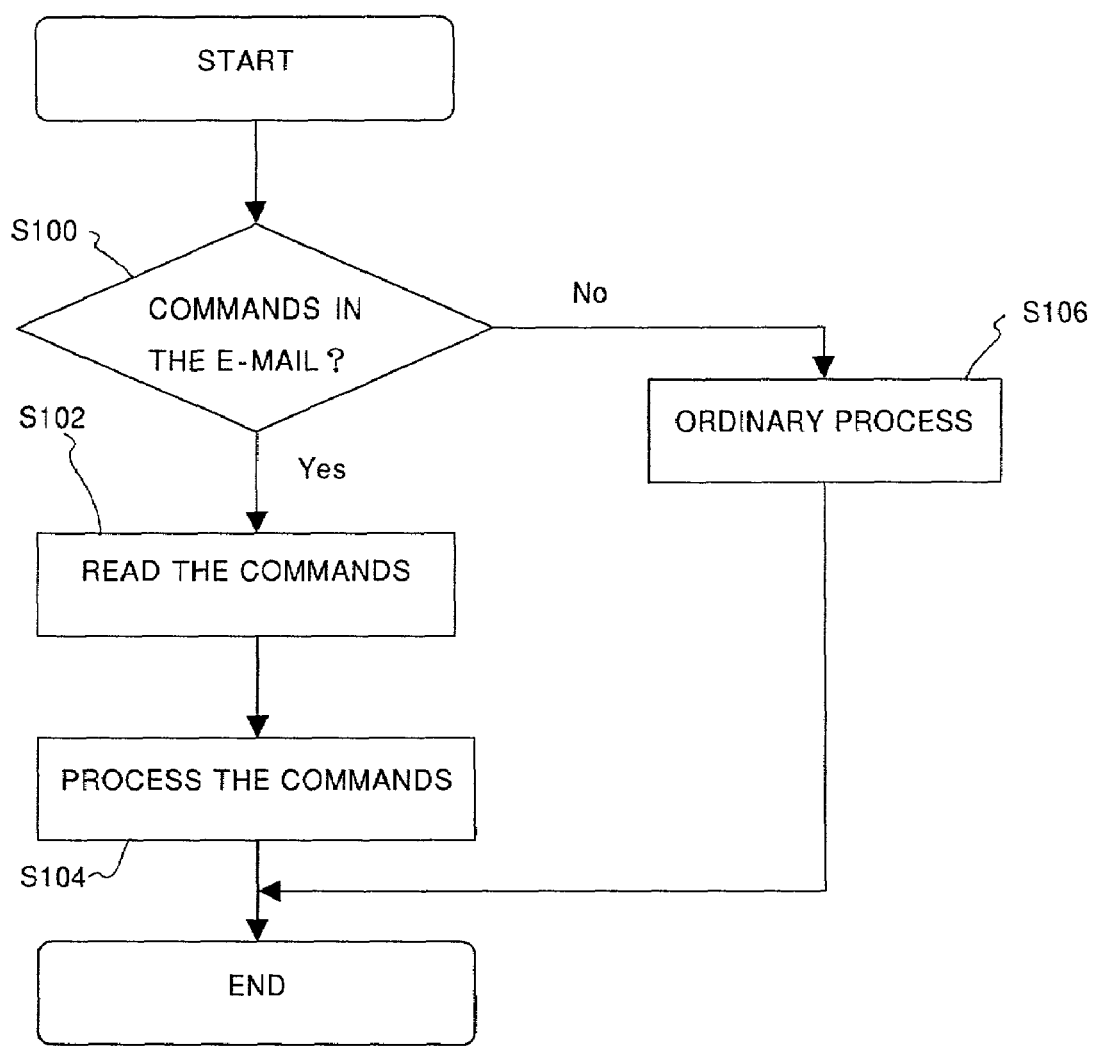
FIG. 7 is a flow chart of action of the contents delivery system of a first embodiment.

The E-mail received by the data receiver 16 is processed as shown in FIG. 7.

Firstly, the data receiver 16 checks if the commands for processing the contents are included in the body zone of the E-mail 24 or not (step S100)

If the commands are included, the data receiver 16 reads the commands (step S102).

The data receiver 16 executes the commands to process an attached file, which is written in the contents zone of the E-mail 24 (step S104). For example, the attached file is thawed, the thawed contents are stored in the memory unit. When the process is finished, the contents delivery is completed.

If the commands are not included in the step S100, ordinary mail receiving action is executed (step S106).

By using the E-mails, which have been widely used in society, the contents can be economically delivered without specific equipment. Since the E-mails can be simultaneously delivered to a plurality of members, the contents can be simultaneously delivered to a plurality of the data receivers 16.

Second Embodiment

In the contents delivery system of the first embodiment, the data transmitter 14 cannot know if the contents are securely received by the data receiver 16 or not.

To securely deliver the contents, the data transmitter 14 should know if the contents are securely received and properly processed by the data receiver 16 or not.

Then, in a second embodiment, the data receiver 16 transmits a return E-mail, in which a result of the delivery is written, to the data transmitter 14.

Basic structures of the data transmitter 14 and the data receiver 16 of the second embodiment are equal to those of the first embodiment. An E-mail communication system is a two-way communication system, so the data receiver 16 can transmit the E-mails, and the data transmitter 16 can receive the E-mails.

Figure 8:
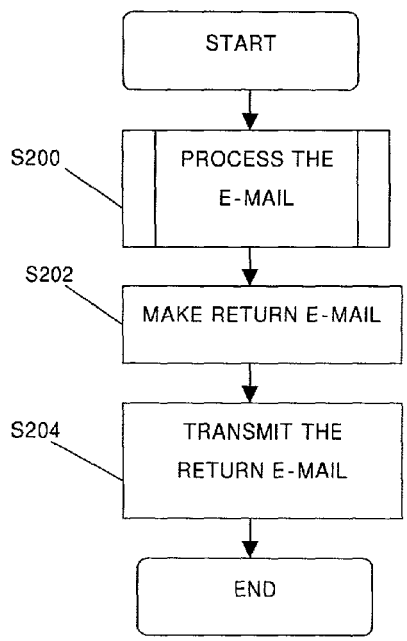
FIG. 8 is a flow chart of action of the contents delivery system of a second embodiment.

Next, action of the data receiver 16 will be explained with reference to FIG. 8.

When the data receiver 16 receives the E-mail, the data receiver 16 executes the process shown in FIG. 7 (step S200).

Then, if the E-mail is normally received and the attached file is normally processed, the data receiver 16 makes the return E-mail of "Normally Completed". On the other hand, if the attached file is not normally processed, the data receiver 16 makes the return E-mail of "Abnormally Completed" (step S202).

Finally, the data receiver 16 transmits the return E-mail to the data transmitter 14 (step S204).

This action is illustrated in FIG. 9.

The E-mails 24, to which the contents are attached, are transmitted from the data transmitter 14 to the data receivers 16a and 16b. The E-mails 24 are respectively delivered to the data receivers 16a and 16b via routes (1) and (2), which run through the internet 12.

The data receiver 16a and 16b respectively transmit the return E-mails 16, in each of which the result of "Normally Completed" or "Abnormally Completed" is written, to the data transmitter 14. The return E-mails 26 are sent to the data transmitter 14 via routes (3), which run through the internet 12. The data transmitter 14 reads bodies of the return E-mails 26, so that the data transmitter 14 can confirm if the contents have been correctly delivered to the data receivers 16a and 16b or not.

Third Embodiment

In the first and the second embodiments, the contents is attached to the E-mail, which is sent from the data transmitter 14 to the data receiver 16.

However, in the foregoing embodiments, capacity of the E-mail is great, so a communication line between the data transmitter 14 to the internet 12 is crowded if the contents are delivered to a large number of the data receivers 16; it is difficult to efficiently deliver the contents.

Figure 10:
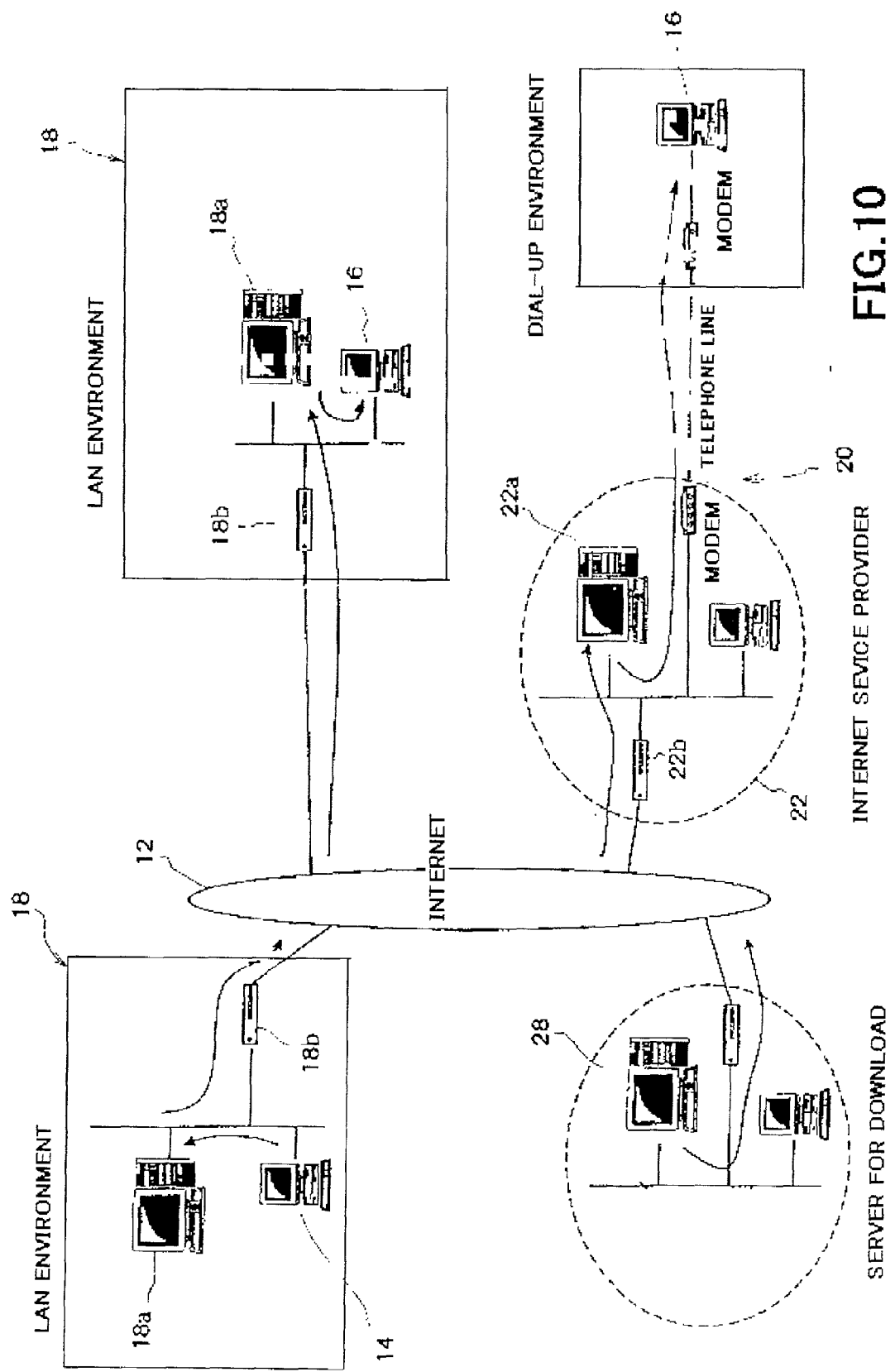
FIG. 10 is a flow chart of action of the contents delivery system of a third embodiment.

To solve the problem, a server or servers 28, e.g., an FTP server, an HTTP server, for download are connected to the internet 12 (see FIG. 10). The contents to be delivered to the data receiver 16 are stored in the server 28.

A name of the server 28, in which the contents have been stored, and a storing path in the server 28, which indicates a path for retrieving the contents to be delivered to the data receiver 16, are written in the body zone of the E-mail 24. No contents are attached to the E-mail 24.

The data receiver 16 has a unit for accessing the server 28 written in the E-mail 24 and downloading the contents from the server 28 via the storing path written in the E-mail 24. For example, the computer of the data receiver 16 acts as the unit for accessing the server 28.

With the above described structure, no contents may be attached to the E-mails 24, so that amount of data of the E-mails 24 can be reduced and data concentration, which occurs in the line between the data transmitter 14 and the internet 12, can be avoided. Therefore, the contents can be efficiently delivered, even if the contents are delivered to a large number of the data receivers 16.

Figure 11:
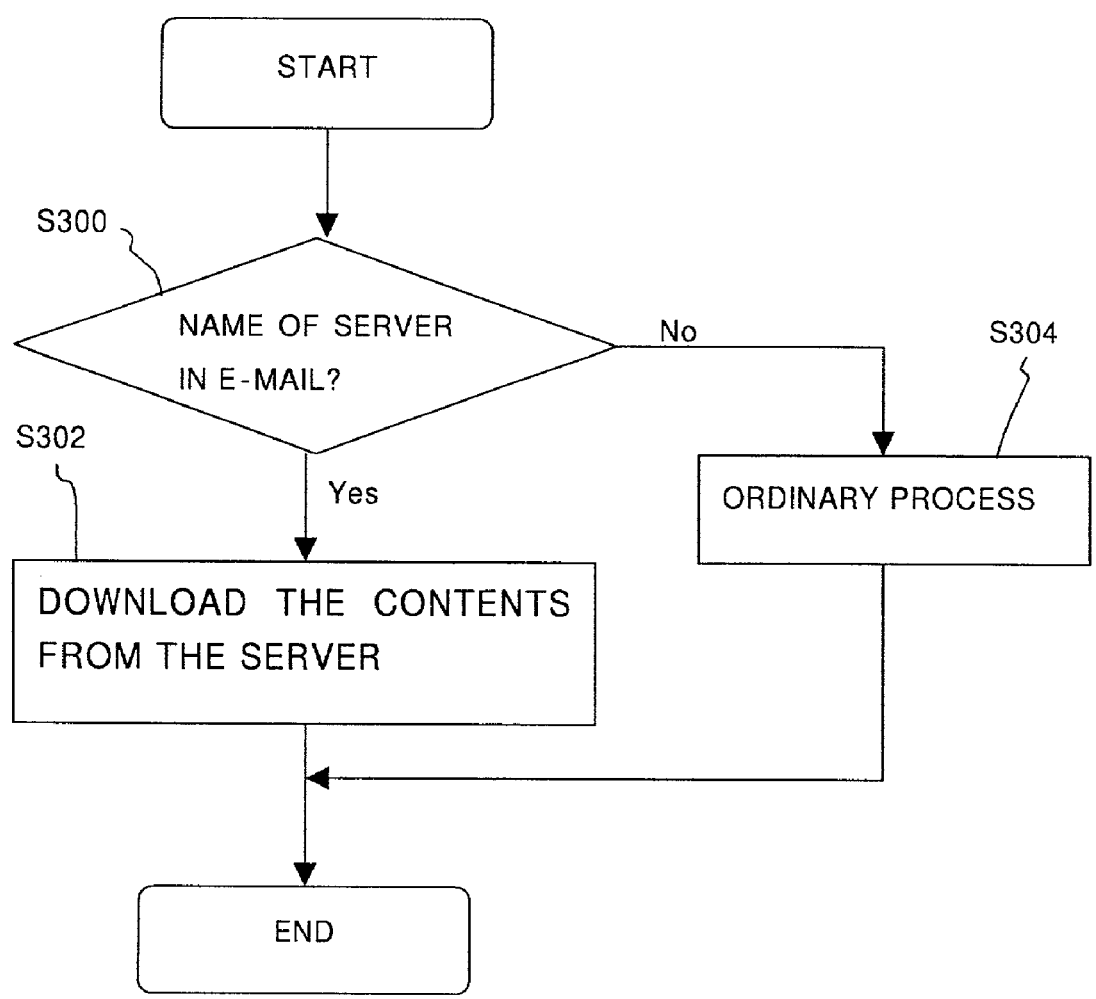
FIG. 11 is a flow chart of action of the contents delivery system shown in FIG. 10.

When the data receiver 16 receives the E-mail 24, as shown in FIG. 11, the data receiver 16 checks if a name of the server 28 for download is included in the body zone of the E-mail 24 or not (step S300).

If the name of the server 28 is included, the data receiver 16 accesses the server 28 via the string path, which is also written in the body zone of the E-mail 24, and downloads the contents from an object directory (step S302). The process is completed when the contents are downloaded.

Note that, in the case of thawing the compressed contents or storing the contents in the memory unit after downloading, the commands for processing the contents, e.g., thawing, storing, are written in the body zone of the E-mail 24 so as to make the data receiver 16 execute the commands.

At the step S300, if no server name is included in the body zone of the E-mail 24, an ordinary process is executed (step S304), then the process is completed.

In the present embodiment, music data, commercial message (CM) data, schedule data and image data including photograph and video data are delivered as the contents. Some contents are protected by copyrights. Uploading the contents to the server 28 in the internet 12 is regarded as copying works and transmitting works on line, so the contents protected by copyrights must be properly treated.

Figure 14:
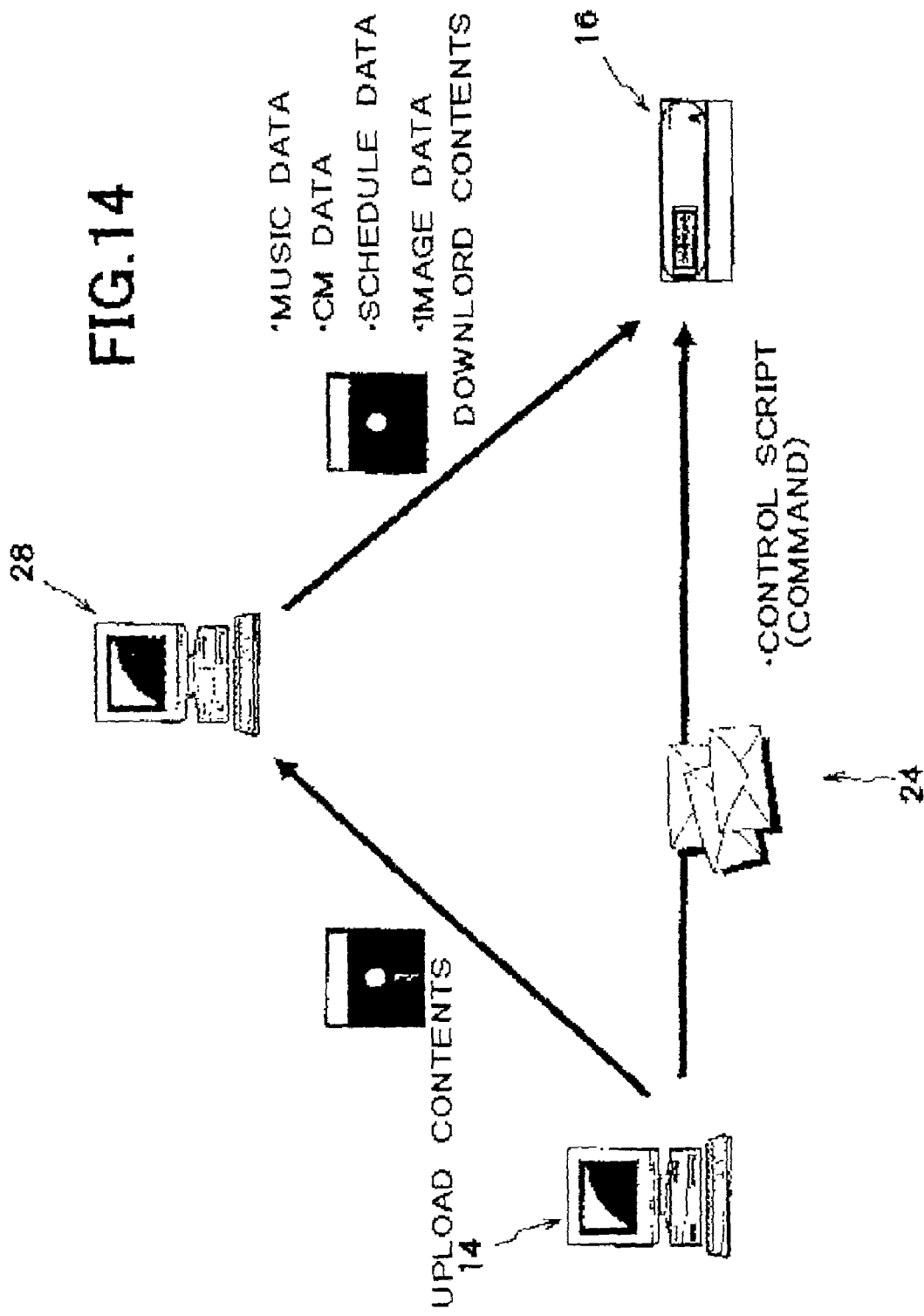
FIG. 14 is an explanation view showing a copyright protection system of the third embodiment, which is capable of uploading lawful contents to a communication network.

In this case, firstly the data transmitter 14 is connected to the server 28 in the internet 12 so as to upload the contents thereto (see FIG. 14).

A licensee of the copyrights, who was licensed from a copyright holder or holders and who can legally copy and transmit the contents on line, uploads the contents to the server 28 by the data transmitter 14.

Then, the licensee transmits the E-mail 24 to the data receiver 16, e.g., an IMS equipment, by the data transmitter 14. Note that, uploading the contents and transmitting the E-mail 24 may be executed by one data transmitter 14 or separated data transmitters 14.

The action of the data transmitter or transmitters 14 have been described above, and the data receiver 16 downloads the object contents from the server 28.

An example of a music delivery system, which delivers background music (BGM) to a shop, will be explained with further reference to FIG. 15.

In many cases, background music and commercial messages are delivered to the shop.

Figure 15:
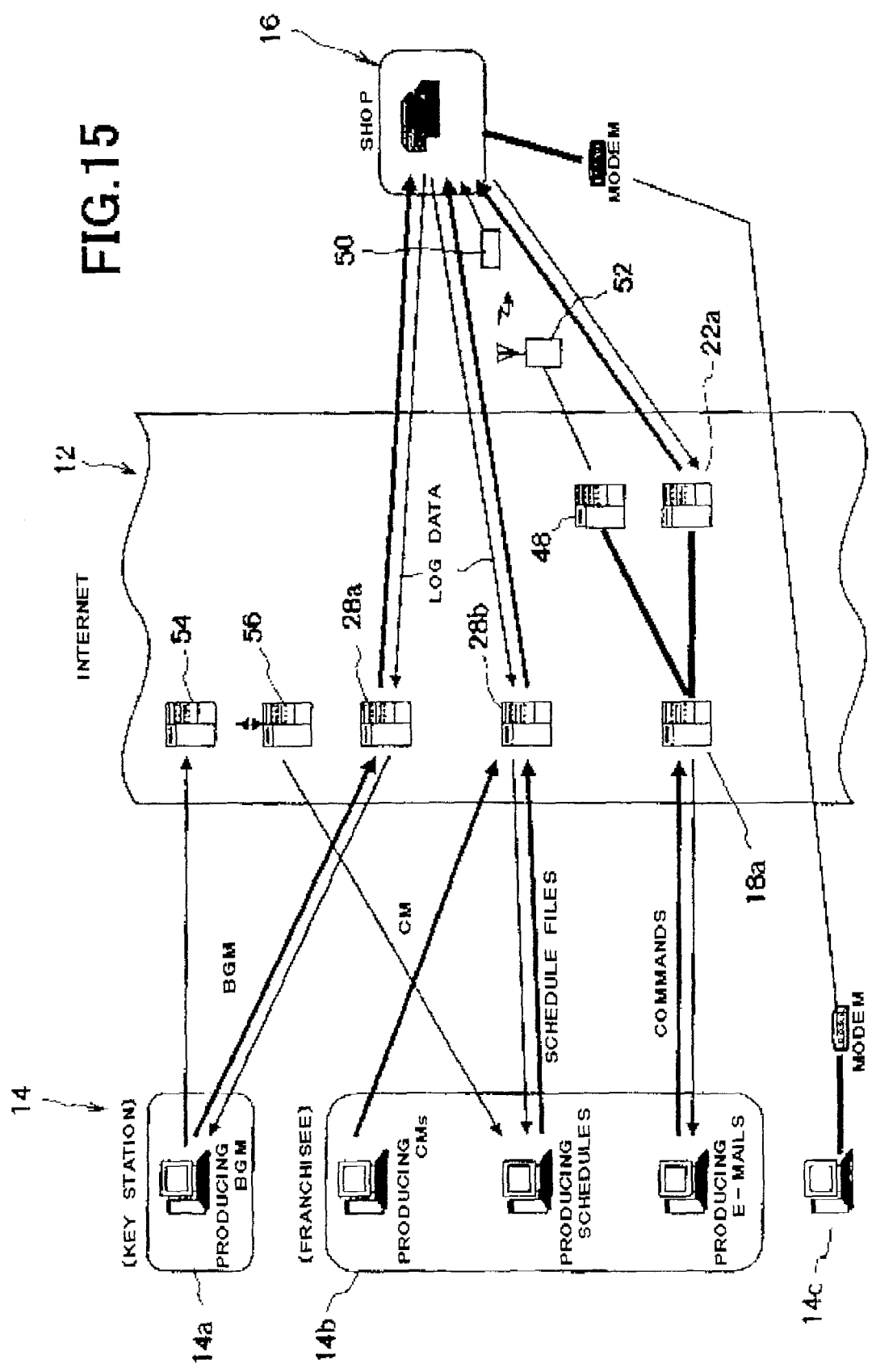
FIG. 15 is an explanation view of the contents delivery system of the third, a fourth, a fifth and a sixth embodiments.

As shown in FIG. 15, the licensed data transmitter 14 shown in FIG. 14 includes; a first data transmitter 14a, which is a key station for making and uploading the contents (BGMs); and a second data transmitter 14b, which is capable of legally using the BGMs on the basis of contract with the key station 14a and which makes the commercial messages (the contents) and reproduction schedule and transmits the E-mails 24. The first data transmitter 14a is the licensed member (licensee), so the second data transmitter 14b also becomes the licensed member due to the contract.

Note that, in the second data transmitter 14b, the commercial messages, the reproduction schedules and the E-mails are usually processed in parallel. In this case, as shown in FIG. 15, the second data transmitter 14b is divided into, for example, three parts: a part of producing CMs; a part of producing schedules; and a part of producing E-mails.

On the other hand, four servers 28a, 28b, 18a and 22a are connected to the internet 12 so as to correspond the data transmitters 14a and 14b. The server 28a is an FTP server for the key station and capable of storing music data, which are uploaded by the first data transmitter 14a. The server 28b is an FTP server for a franchise and capable of storing the CM data and the schedule data uploaded by the second data transmitter 14b. The server 18a is a mail server for storing the E-mails 24 made and uploaded by the second data transmitter 14b. The server 22a is a mail server for the data receiver 16.

In FIG. 15, the second data transmitter 14b makes the CM data and the schedule data and uploads them to the server 28b.

Next, the second data transmitter 14b requests the first data transmitter 14a to upload the music data on the basis of the schedule data.

The first data transmitter 14a uploads the requested music data to the server 28a. Therefore, uploading music data can be always watched by the licensee, so that uploading illegal contents can be effectively prevented.

When the second data transmitter 14b confirms that the music data are already uploaded to the server 28a, the second data transmitter 14b makes and uploads the E-mail 24. The E-mail 24 is sent to the mail server 22a via the mail server 18a in the internet 12 and stored therein.

To confirm if the music data are already uploaded to the server 28a or not, an SQL server 54 and an HTTP server 56 are provided in the internet 12 and the key station 14a forms a home page in the internet 12 (see FIG. 15). The key station 14a notices data of all contents, license data and package data of the contents, etc. The second data transmitter 14b can access the home page and know the noticed data. Further, the second data transmitter 14b can confirm if object music data are uploaded or not.

The data receiver 16 accesses the mail server 22a to receive the E-mail 24. Then, the data receiver 16 reads the names or addresses of the servers 28a and 28b, and storing paths of the music data and the CM data stored in the servers 28a and 28b. The data receiver 16 accesses the server 28a and retrieve the music data via the storing path, so that the object music data can be downloaded. And, the data receiver 16 accesses the server 28b and retrieve the CM data and the schedule data via the storing paths, so that the object CM data and the object schedule data can be downloaded.

With this action, the data receiver 16 can reproduce the music data and the CM data on the basis of the schedule data. Namely, the music data are reproduced in the shop as background music.

Fourth Embodiment

In the foregoing embodiments, number of using the downloaded contents cannot be known by the data transmitter 14.

The contents delivery system of a fourth embodiment solves the problem.

The feature of the fourth embodiment is a second server. In FIG. 15, the servers 28a and 28b act as the second server. Of course, an independent server may be connected to the internet 12 as the second server.

The data receiver 16 has a unit for periodically uploading log data of actional history to the second server (the servers 28a and 28b in the fourth embodiment). The actional history includes date and number of reproducing the downloaded music data.

The first data transmitter 14a and/or the second data transmitter 14b has a unit for accessing the second server and downloading the log data. The computer of the first data transmitter 14a and/or the second data transmitter 14b may act as the unit for accessing the second server. Of course, an independent unit for accessing the second server may be employed.

With this structure, the data transmitter 14 is capable of watching the number of using the contents, etc. of the data receiver 16. For example, in FIG. 15, the key station (the first data transmitter) 14a and the part of producing CMs of the second data transmitter 14b are capable of downloading the log data, which have been uploaded to the servers 28a and 28b.

And, the data receiver 16 may inform the log data to the data transmitter by E-mail.

By the contents delivery system of the fourth embodiment, the data transmitter 14 can correctly charge rental fees or license fees of the contents to the data receiver 16.

Fifth Embodiment

In the foregoing embodiments, the data receiver 16 must periodically access to own mail server 22a so as to check if the E-mail 24 is received or not. A fifth embodiment solves the problem.

In FIG. 15, a pager server 48 is connected to the internet 12. The E-mails 24 from the data transmitter 14 (the second data transmitter 14b in FIG. 15) are inputted to the pager server 48 via the mail server 18a.

The pager server 48 is connected to a base station 52, which transmits contents of the E-mail 24, which has been inputted to the pager server 48, to an assigned pager 50, whose number is written in an address part of the E-mail 24, by radio.

The pager 50 is connected to the data receiver 16. Note that, the data receiver 16 may have the function of the pager 50.

In the case of using the pager 50 which acts like a pocket bell (trademark), the E-mails 24 sent via the internet 12 can be directly received by the pager 50. Therefore, the pager 50 may be provided to the data receiver 16 so as to directly receive the E-mails 24 without accessing to the mail server 22a and downloading the E-mails 24 therefrom.

Sixth Embodiment

The contents delivery system of the present embodiment has the features of the foregoing embodiments. Further, the contents delivery system is capable of executing system check and maintenance of the data receiver 16.

An example of maintenance will be explained. In FIG. 15, the data transmitter 14 attaches a version-up program to the E-mail as the contents, and action of version-up action is written in the body zone of the E-mail 24. The data transmitter 14 transmits the E-mail to make the data receiver 16 execute the version-up action. Note that, when the version-up action is executed, results of the version-up may be transmitted to the data transmitter 14 as the return E-mail 26.

For example, in FIG. 15, a third data transmitter 14c for maintenance is independently provided. The E-mail 24 is sent from the third data transmitter 14c to the data receiver 16 via a modem, the internet 12 and another modem.

To execute the system check, commands for self-checking the data receiver 16 and transmitting a return E-mail, in which results of self-check, etc. are written, are written in the body zone of the E-mail 24. Namely, the third data transmitter 14c makes the data receiver 16 execute self-check. The results of the self-check is attached to the return E-mail 26 as the contents, and the return E-mail 26 is transmitted to the data transmitter 14. When an error is occurred in the data receiver 16, details of the error may be attached to the return E-mail 26 as the contents. In this case, the data receiver 16 delivers the contents (the details of the error) to the data transmitter 14.

Further, commands for executing countermeasure to the results of the self-check, details of setting, details of errors, etc. may be written in the body zone of the return E-mail 26 to the data transmitter 14 so as to make the data transmitter 14 process the contents.

Note that, the results of the self-check may be written in the body zone of the return E-mail without attaching as the contents.

The flow of the E-mail is equal to that of the third embodiment (see FIG. 9).

Seventh Embodiment

The contents delivery system 10 of a seventh embodiment is applied to deliver music data, CM data and schedule data.

Figure 12:
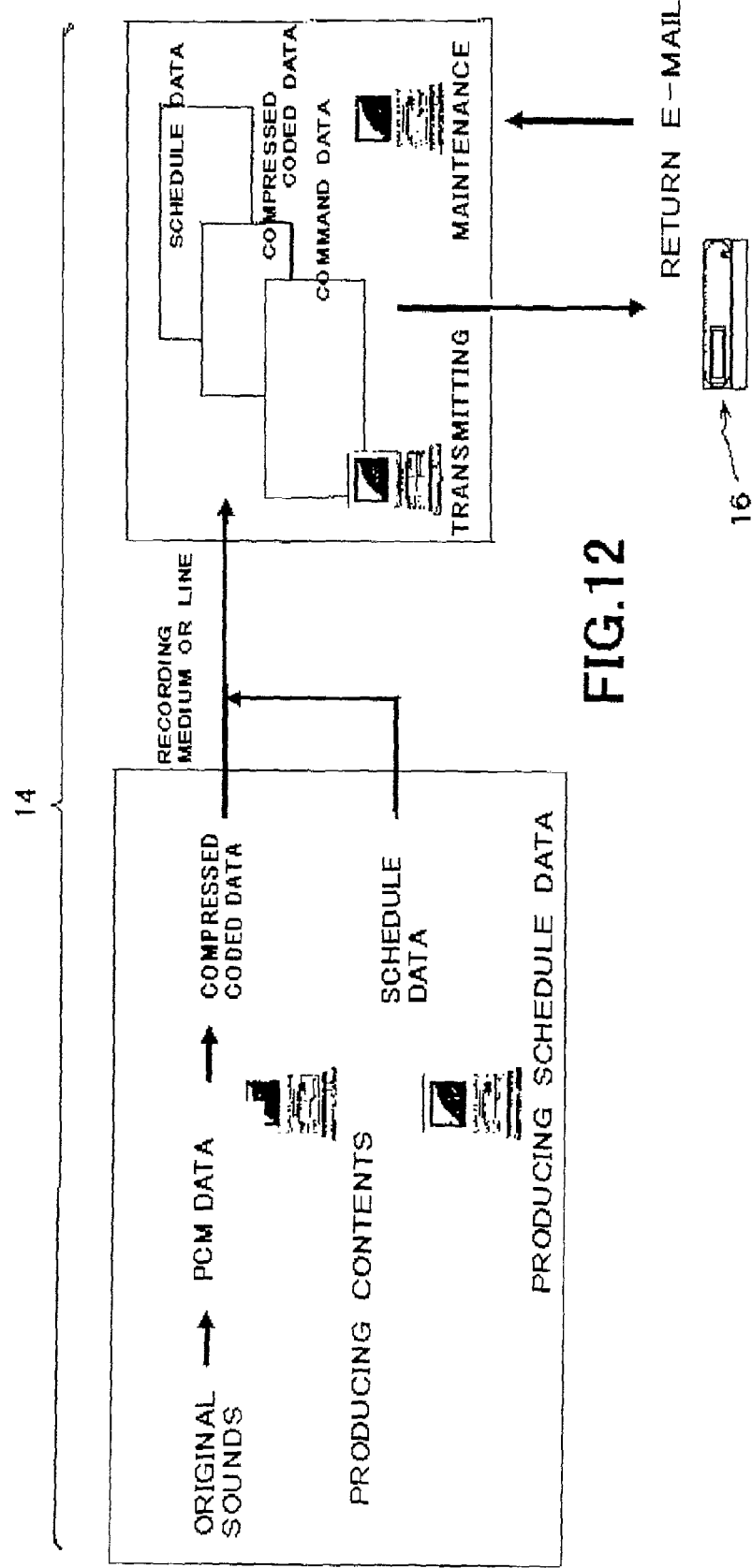
FIG. 12 is an explanation view of a data transmitter of a seventh embodiment.

In FIG. 12, the data receiver 16 is a public address unit, which is capable of processing the delivered music data, the delivered CM data and the delivered schedule data. The unit 16 converts the music data and the CM data into electric signals on the basis of the schedule data, distributes the electric signals to speakers in a shop, and reproduces music and commercial messages.

The data transmitter 14 for producing music data, CM data and schedule data will be explained with reference to FIG. 12.

As well as the foregoing embodiments, the data transmitter 14 can be constituted by a personal computer or a work station.

In a part of producing the contents, original sounds, which are recorded in CDs, tapes, etc., are converted into digital signals to produce PCM data, e.g., WAV file. The PCM data are further converted into a compressed coded data file, which is a file compressed and coded by a manner of MPEG, TwinVQ, etc.

In a part of producing the schedule data, schedule data, which is a text file of scripts in which names of music and CMs and time and method of reproducing the music data and the CM data are written, are produced. The data are inputted to a part of transmitting by a recording medium or a communication line.

In a part of producing the E-mail, the compressed coded data and control commands or scripts, which indicate a manner or manners of processing the contents including the compressed coded data and the schedule data, are written in the body zone of the E-mail 24, the contents are attached to the E-mail 24, and the E-mail 24 is transmitted. The contents are inputted to the part of transmitting by a recording medium or a communication line.

A part of maintenance receives the return E-mail 26 of the data receiver 16, in which the results of contents delivery, a state of the data receiver 16, etc. are included.

Preferably, the part of producing contents, the part of producing CMs, the part of producing schedule data, the part of producing the E-mails and the part of maintenance are respectively constituted by independent computers. With this structure, loads of computers can be properly distrib uted, so that the E-mails 24 and the contents can be efficiently produced. Note that, a plurality of the parts may be constituted by one computer.

Figure 13:
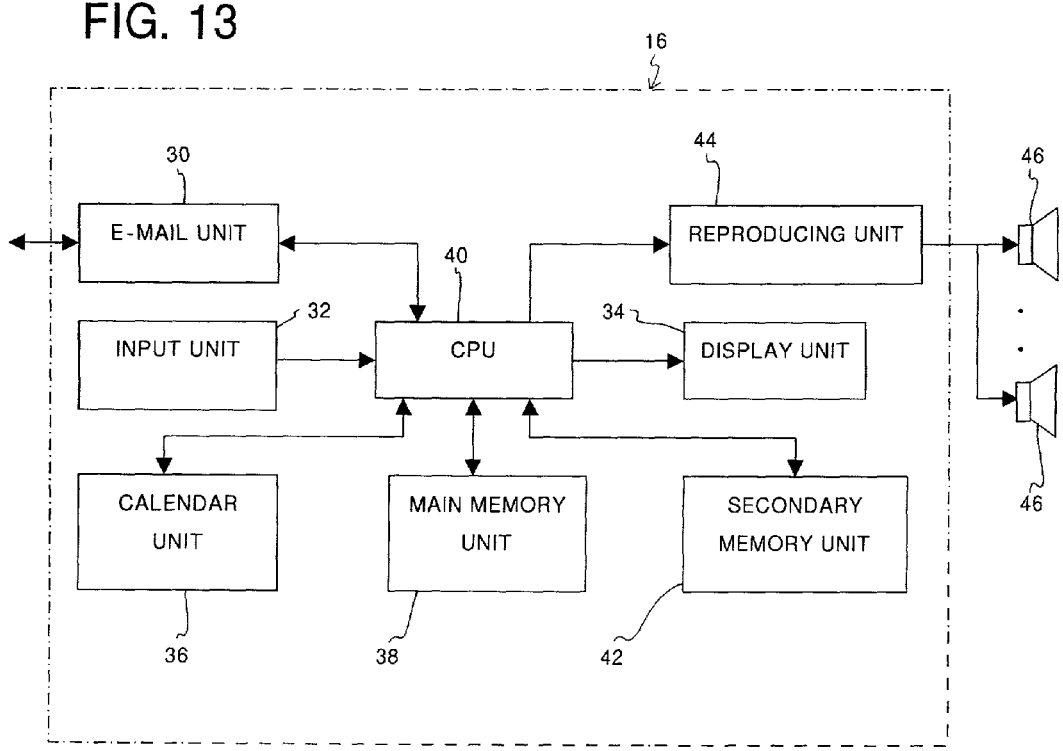
FIG. 13 is an explanation view of a data receiver of the seventh embodiment.

Successively, a structure of the data receiver 16, which reproduces the music data and the CM data on the basis of the schedule data, will be explained with reference to FIG. 13.

If an E-mail unit 30 is connected to the LAN 18, the E-mail unit 30 is constituted by a LAN controller. On the other hand, if the E-mail unit 30 is connected to the dial-up environment 20, the E-mail unit 30 is constituted by a serial controller connected to the modem. Note that, the modem may be included in the E-mail unit 30.

An input unit 32 includes a ten key, inputs setting data to the data receiver 16 and inputs commands to a CPU (Central Processing Unit) 40.

A display unit 34, e.g., a liquid crystal display (LCD), displays the setting data inputted by the input unit 32, present setting data, etc.

A calendar unit 36 always generate date and time data. The calendar unit 36 is backed up by batteries.

A main memory unit 38 is constituted by semiconductor memories, e.g., ROM, RAM. The main memory unit 38 is used as a work memory. The main memory unit 38 stores programs of the CPU 40 and temporally stores commands, which are written in the body zone of the E-mail 24.

A secondary memory unit 42 is constituted by hard disks, etc. The secondary memory unit 42 mainly stores the contents, the schedule data, etc., which are attached to the E-mail 24.

A reproducing unit 44 is constituted by a D/A converter and amps. The reproducing unit 44 converts the contents (the music data and the CM data) into analogue electric signals.

The CPU 40 includes a control unit and an arithmetic logical unit and controls elements of the data receiver 16. The CPU 40 acts as the unit for reading and executing the commands written in the body zone of the E-mail 24, the unit for reading and executing the self-check commands written in the body zone of the E-mail 24, the unit for producing and transmitting the return E-mail and the unit for downloading the contents from the server 28, which is written in the body zone of the E-mail 24.

The data receiver 16 acts as a reproducing equipment or a public address equipment, so the reproducing unit 44 is connected to a plurality of speakers 46 in the shop.

In the contents delivery system of the present invention, the E-mails, which have been widely used in society, are used to deliver the contents, so the contents delivery system can be realized economically, and the contents can be simultaneously delivered to a plurality of the data receivers. Since the commands for processing the contents in the data receiver are written in the E-mails, the contents can be automatically processed, e.g., thawed, stored, in the data receiver or receivers, so that jobs of the data receiver or receivers can be reduced and the contents can be easily delivered.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A contents delivery system, comprising:

a communication network;

a data transmitter for transmitting contents, said data transmitter being connected to said communcation network; and a data receiver for receiving said contents, said data receiver being connected to said communication network, wherein a server, which stores said contents to be received by said data receiver, is connected to said communication network, a name of said server and a storing path of said contents to be received by said data receiver are written in said electronic mail, and said data receiver has a unit for accessing said server written in said electronic mail and downloading said contents from said server via said storing path written in said electronic mail;

wherein said data transmitter is a first data transmitter, a second data transmitter, which uploads said contents to said server, is connected to said communication network, said second data transmitter allows a licensed member to upload said contents to said server, and said first data transmitter allows the licensed member to transmit said electronic mail to said data receiver.

2. The contents delivery system according to claim 1, wherein commands for self-checking said data receiver are written in said electronic mail, and said data receiver has a unit for executing said self-check commands and transmitting another electronic mail, in which results of the self-check are written, to said data transmitter.

3. The contents delivery system according to claim 1, wherein a second server is connected to said communication network, said data receiver has a unit for periodically uploading log data of actional history to said second server, and said first data transmitter and/or said second data transmitter has a unit for accessing said second server and downloading said log data.

4. The contents delivery system according to claim 3, wherein commands for self-checking said data receiver are written in said electronic mail, and said data receiver has a unit for executing said self-check commands and transmitting another electronic mail, in which results of the self-check are written, to said data transmitter.

5. The contents delivery system according to claim 3, wherein a pager server, which receives said electronic mail sent from said data transmitter, is connected to said communication network, a plurality of pagers are connected to said data receiver, a base station, which transmits contents of said electronic mail to an assigned pager, whose number is written in an address part of said electronic mail, by radio, is connected to said pager server, and said data receiver receives said electronic mail via said pager.

6. The contents delivery system according to claim 5, wherein said contents transmitted to said data receiver are music data, and said data receiver has a unit for reproducing said music data.

7. The contents delivery system according to claim 6, wherein commands for self-checking said data receiver are written in said electronic mail, and said data receiver has a unit for executing said self-check commands and transmitting another electronic mail, in which results of the self-check are written, to said data transmitter.

8. The contents delivery system according to claim 5, wherein commands for self-checking said data receiver are written in said electronic mail, and
said data receiver has a unit for executing said self-check commands and transmitting another electronic mail, in which results of the self-check are written, to said data transmitter.

9. The contents delivery system according to claim 3, wherein said contents transmitted to said data receiver are music data, and
said data receiver has a unit for reproducing said music data.

10. The contents delivery system according to claim 9, wherein commands for self-checking said data receiver are written in said electronic mail, and
said data receiver has a unit for executing said self-check commands and transmitting another electronic mail, in which results of the self-check are written, to said data transmitter.

11. The contents delivery system according to claim 1, wherein a pager server, which receives said electronic mail sent from said data transmitter, is connected to said communication network,
a plurality of pagers are connected to said data receiver,
a base station, which transmits contents of said electronic mail to an assigned pager, whose number is written in an address part of said electronic mail, by radio, is connected to said pager server, and
said data receiver receives said electronic mail via said pager.

12. The contents delivery system according to claim 11, wherein said contents transmitted to said data receiver are music data, and
said data receiver has a unit for reproducing said music data.

13. The contents delivery system according to claim 12, wherein commands for self-checking said data receiver are written in said electronic mail, and
said data receiver has a unit for executing said self-check commands and transmitting another electronic mail, in which results of the self-check are written, to said data transmitter.

14. The contents delivery system according to claim 11, wherein commands for self-checking said data receiver are written in said electronic mail, and
said data receiver has a unit for executing said self-check commands and transmitting another electronic mail, in which results of the self-check are written, to said data transmitter.

15. The contents delivery system according to claim 1, wherein said contents transmitted to said data receiver are music data, and
said data receiver has a unit for reproducing said music data.

16. The contents delivery system according to claim 15, wherein commands for self-checking said data receiver are written in said electronic mail, and
said data receiver has a unit for executing said self-check commands and transmitting another electronic mail, in which results of the self-check are written, to said data transmitter.

17. A contents delivery system, comprising:
a communication network;
a data transmitting contents, said data transmitter being connected to said communication network; and
a data receiver for receiving said contents, said data receiver being connected to said communication network,
wherein a server, which stores said contents to be received by said data receiver, is connected to said communication network,
a name of said server and a storing path of said contents to be received by said data receiver are written in said electronic mail, and
said data receiver has a unit for accessing said server written in said electronic mail and downloading said contents from said sever via said storing path written in said electronic mail;
wherein a pager server, which receives said electronic mail sent from said data transmitter, is connected to said communication network,
a plurality of pagers are connected to said data receiver,
a base station, which transmits contents of said electronic mail to an assigned pager, whose number is written in an address part of said electronic mail, by radio, is connected to said pager server, and
said data receiver receives said electronic mail via said pager.

18. The contents delivery system according to claim 17, wherein said contents transmitted to said data receiver are music data, and
said data receiver has a unit for reproducing said music data.

19. The contents delivery system according to claim 18, wherein commands for self-checking said data receiver are written in said electronic mail, and
said data receiver has a unit for executing said self-check commands and transmitting another electronic mail, in which results of the self-check are written, to said data transmitter.

20. The contents delivery system according to claim 17, wherein commands for self-checking said data receiver are written in said electronic mail, and
said data receiver has a unit for executing said self-check commands and transmitting another electronic mail, in which results of the self-check are written, to said data transmitter.

21. A contents delivery system, comprising:
a communication network;
a data transmitter for transmitting contents, said data transmitter being connected to said communication network; and
a data receiver for receiving said contents, said data receiver being connected to said communication network,
wherein a server, which stores said contents to be received by said data receiver, is connected to said communication network,
a name of said server and a storing path of said contents to be received by said data receiver are written in said electronic mail, and said data receiver has a unit for accessing said server written in said electronic mail and downloading said contents from said server via said storing path written in said electronic mail;

wherein commands for self-checking said data receiver are written in said electronic mail, and said data receiver has a unit for executing said self-check commands and transmitting another electronic mail, in which results of the self-check are written, to said data transmitter.

* * * * *